Oct. 4, 1949.      A. R. NELSON      2,483,502
ELECTRIC CLOCK
Filed Feb. 3, 1945
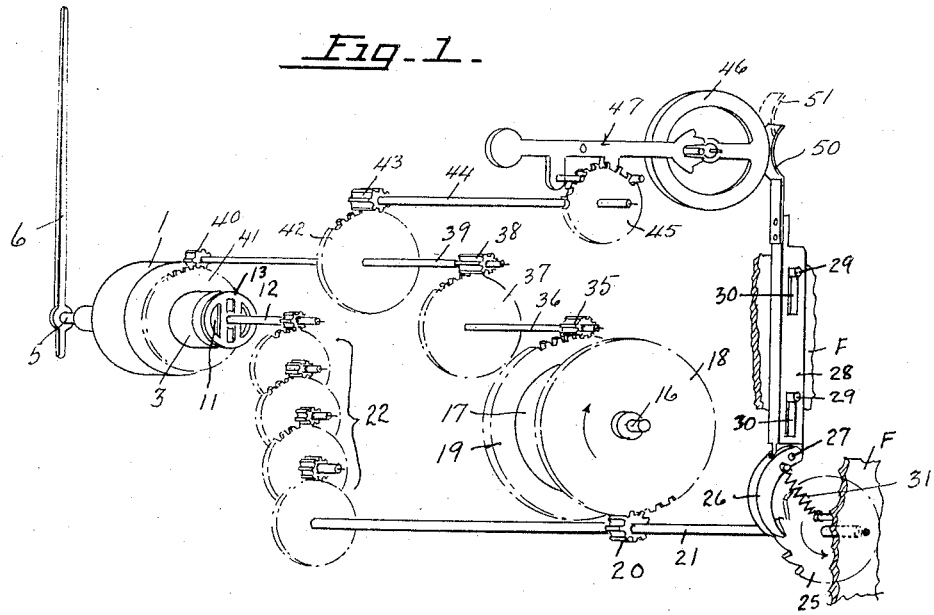
INVENTOR.
ANTON R. NELSON
BY
Boyken, Mohler, & Beckley
ATTORNEYS Patented Oct. 4, 1949

2,483,502

UNITED STATES PATENT OFFICE 2,483,502

ELECTRIC CLOCK

Anton R. Nelson, Burlingame, Calif.

Application February 3, 1945, Serial No. 575,993

6 Claims. (Cl. 58—26)

This invention relates to electric clocks, and particularly to clocks driven by synchronous motors in alternating current electrical circuits of uniform frequency or cycles, and generally of the type shown in United States Letters Patent No. 1,430,867, of October 3, 1922, or No. 1,456,082 of May 22, 1923, and others, all for the most part issued to Warren.

One of the objects of this invention is the provision of an improved system for keeping a clock of the above type running during a current interruption and which system is simpler and more reliable than heretofore.

Another object of the invention is the provision of an auxiliary motor for a clock normally driven by an electric motor in an electrical circuit and of improved means for insuring operation of said auxiliary motor in driving the clock during an interruption of the current in said circuit.

A still further object is the provision for an improved system and means for winding an auxiliary spring motor in a clock normally driven by an electrical motor whereby said spring motor will drive the clock when there is an interruption in the current to said electrical motor.

Heretofore various systems for insuring against stoppage of an electric clock during a current interruption have been employed, all requiring an auxiliary motor of some kind to keep the clock running. Most of these auxiliary motors are spring wound. Some are arranged so that some or all of the parts of the auxiliary motor are kept running at all times, irrespective of whether or not there is a current interruption, which is undesirable. In others the auxiliary spring motor includes a balance wheel that is releasably held during the time the electrical motor drives the clock, but which wheel is released when there is a cessation of the current to the electrical motor. The balance wheel is supposed to be held under tension of a hair spring or the like, and to automatically start the spring motor when it is released, which it fails to do many times where it has been inactive for a long time and the oil in the bearings has become hard or gummy. Most spring wound auxiliary clocks are relatively complicated.

With my invention, a spring auxiliary clock is used but it is relatively simple and its balance wheel is positively rotated upon an interruption in the current to the main electrical motor, thus insuring against any failure in starting. Also no special unloading device for the spring is required when the latter is wound, and overwinding of the spring is impossible. Furthermore, the complete auxiliary motor drive with my invention may be behind the electrical motor (relative to the face of the clock) instead of being between the motor and clock face, providing an extremely compact arrangement.

Other objects and advantages will appear in the drawings and description.

In the drawings,

Fig. 1 is a diagrammatic view of a clock system illustrative of my invention.

Fig. 2 is an enlarged part sectional part elevational view of a portion of a conventional electrical motor but showing the motor rotor for winding the spring motor.

Fig. 3 is a reduced end view of the motor of Fig. 2 looking from the left of the latter and showing the conventional field coil and magnets of the electrical motor.

In detail, the conventional synchronous electrical motor shown for driving the clock hands is what is commonly known as a "Telechron" motor comprising a cylindrical housing 1 enclosing transmission gears (not shown) such as shown on the above mentioned Warren patents and which transmission gears are driven by a rotor 2 (Fig. 2) in a reduced diameter cylindrical tubular extension 3 projecting from the housing 1 coaxial therewith. Rotor 2 is on a shaft 4 that is coaxial with housing 1 and which shaft is the drive shaft for the transmission gearing. A motor shaft 5 driven by the transmission gearing is in axial alignment with rotor shaft 4 and projects from the side of housing 1 that is opposite said rotor shaft. This motor shaft 5 may be the second hand shaft carrying second hand 6 (Fig. 1) that is outwardly of face 7 (Fig. 2) of the clock. A gear 8 is secured on the shaft 5 between the face 7 and the motor, which gear drives the usual train of gears (not shown) that drives the hour and minute hands, substantially as shown in my United States Letters Patent No. 2,055,042 of September 22, 1936, and as shown in the said two Warren Patents Nos. 1,430,867 and 1,456,082.

There is nothing new in the parts as described above, but instead of securing the housing 1 and extension 3 stationary, as has been done heretofore, I rotatably mount said housing and extension on bearings 9, 10 that are secured to the usual stationary frame carrying the works, a portion of which frame is designated F (Fig. 1).

Unless the extension 3 of the housing 1 is specifically referred to hereafter, the word "housing" or the term "housing 1," is intended to include the extension 3.

As stated above, with my invention the housing 1 is rotatable in bearings 9, 10 unless restrained.

On the outer end wall 11 of extension 3, and coaxial with shaft 4, I provide a bearing for one end of a shaft 12 that is in axial alignment with shaft 4. The other end of the shaft 12 is suitably mounted in a conventional bearing in any suitable part of the clock frame, and secured on shaft 12 closely adjacent wall 11 is a rotor 13 that is like the rotor 2 (Fig. 2). There is ample flux from the usual magnets 14 of field coil 15 (Fig. 3) to drive rotor 13 and to furnish power for winding a conventional clock spring. Such spring (not shown) is secured at one end to a shaft 16 (Fig. 1) and its opposite end is secured to a cylindrical housing 17 that encloses said spring. This is the usual structure in ordinary spring driven clocks.

The shaft 16 carries a gear 18 and the end of housing 17 carries a gear 19 that is rotatable on said shaft. The gear 18 is in mesh with a pinion 20 on shaft 21 and said shaft has a driving connection with the shaft 12 that carries rotor 13 through a gear-pinion train generally designated 22 (Fig. 1) whereby the rotor 13 will wind the clock spring in housing 17.

Secured on shaft 21 is a toothed ratchet wheel 25. One end of a pawl 26 is pivoted at 27 to one end of a slide 28 that is held by pins 29 on frame F for sliding within the limits defined by the ends of slots 30 through which said pins extend. A spring 31 secured at one end to pawl 26 and at its opposite end to frame F yieldably holds the end of the pawl opposite pivot 27 in engagement with the teeth of wheel 25 at one side of the latter.

During winding of the spring the pawl 26 will slide over the teeth of the ratchet wheel, and the slide 28, which is shown vertical, is at the lowermost end of its movement. Spring 31 may tend to yieldably hold the slide down if gravity is insufficient. As will later appear, it is quite important that the length of slots 30 and the position of the end of pawl 26 that is in engagement with the ratchet wheel are such that a reverse movement of the ratchet wheel 25 will lift the slide 28 a substantial distance until the lower ends of slots 30 engage pins 29 when the ratchet wheel will be held by the pawl and slide against further reverse movement.

The gear 19 that is secured on spring housing 17 is in mesh with a pinion 35 secured on a shaft 36. A gear 37 is secured on shaft 36, which gear is in mesh with a pinion 38 on shaft 39.

A pinion 40 secured on shaft 39 is in mesh with a ring gear 41 that is secured on extension 3 of housing 1.

Also secured on shaft 39 is a gear 42, which gear is in mesh with a pinion 43 secured on a shaft 44 that in turn carries an escapement 45 that imparts periodic impulses to balance wheel 46 through the conventional partially mounted detent or lock mechanism 47 for oscillating the balance wheel. A conventional hair spring (not shown) is connected with the balance wheel shaft for functioning in its usual manner.

At the upper end of slide 28 is secured a leaf spring 50 that is adapted to functionally engage one side of balance wheel 46 when the slide is in its lowermost position thus locking the clock movement between the gear 41 on the extension 3 of housing 1 unless and until the balance wheel is released.

In operation when the current to the field coil 15 is on and the main clock rotor 2 is driving the clock hands or time indicator, the rotor 13 will also be actuated for winding the spring of the spring motor through the gear-pinion chain 22 and gears 18, 20. The spring that is being wound is sufficiently strong to resist further winding by rotor 12 without injury to said spring at a predetermined point, and from that point on the rotor 13 will merely function to hold the ratchet wheel 25 in the position indicated in Fig. 1 and in which position the slide 28 is at the lowermost end of its stroke.

In the event of an interruption in the electrical current, the spring in housing 17 will instantly effect sharp reverse movement of ratchet wheel 25 thereby causing a rapid upward movement of slide 28. The spring 50 on the upper end of slide 28 will move to position 51 completely free of the balance wheel 46, and in so moving to said position it will positively rotate the balance wheel thereby commencing actuation thereof by the spring in housing 17, and the housing 1, including the transmission gears therein and motor shaft 5 as a unit, will immediately be rotated by the spring motor to continue driving the time indicator at the proper rate of speed.

As soon as the current to the electric motor is resumed, the rotor 13 will again drive the ratchet in the direction of the arrow indicated thereon and slide 28 will be moved back to the position indicated in Fig. 1 in which position the spring 50 again holds the balance wheel 46 and the hands of the clock are driven by rotor 2 in the usual manner.

It is to be understood that the drawings and the foregoing description are not to be considered restrictive of the invention but are merely illustrative of a preferred form thereof.

I claim:

1. In an electric clock having a synchronous electric motor that includes a motor shaft for driving a time indicator and an electrically driven rotor coaxial therewith, power transmission gears connecting said rotor with said motor shaft, a housing from which said motor shaft rotatably projects enclosing and supporting said gears and said rotor, field magnets in an electrical circuit adjacent said rotor for causing rotation thereof when said circuit is closed, means mounting said housing for rotation about the axis of said motor shaft, a second spring motor for revolving said housing, transmission gears and shaft as a unit about the axis of said shaft for continuing normal rotation of the latter upon interruption of current in said circuit, driving means connecting said second motor with said housing for so revolving the latter, a mechanical starter for said second motor operatively connected therewith, and means actuated by the spring of said spring motor for positively and automatically actuating said starter for starting said second motor upon said cessation of current.

2. In an electric clock having a synchronous electric motor that includes a motor shaft for driving a time indicator and an electrically driven motor coaxial therewith, power transmission gears connecting said rotor with said motor shaft, a housing from which said motor shaft rotatably projects enclosing and supporting said gears and said rotor, field magnets in an electrical circuit adjacent said rotor for causing rotation thereof when said circuit is closed, means mounting said housing for rotation about the axis of said motor shaft, a second motor for revolving said housing, transmission gears and shaft as a unit about the axis of said shaft for continuing normal rotation of the latter upon interruption of current in said circuit, driving means connecting said second motor with said housing for so revolving the latter, a mechanical starter for said second motor operatively connected therewith, and means for positively and automatically actuating said starter for starting said second motor upon said cessation of current, said last mentioned means comprising a power spring.

3. In an electric clock having a synchronous electric motor that includes a motor shaft for driving a time indicator and an electrically driven rotor coaxial therewith, power transmission gears connecting said rotor with said motor shaft, a housing from which said motor shaft rotatably projects enclosing and supporting said gears and said rotor, field magnets in an electrical circuit adjacent said rotor for causing rotation thereof when said circuit is closed, means mounting said housing for rotation about the axis of said motor shaft, a second motor for revolving said housing, transmission gears and shaft as a unit about the axis of said shaft for continuing normal rotation of the latter upon interruption of current in said circuit, driving means connecting said second motor with said housing for so revolving the latter, a combined mechanical starter and governor for said second motor operatively connected therewith, said second motor including a power spring as its source of driving power, movable means providing an operative connection between said spring and said starter and governor for automatically actuating the same for starting said second motor upon said cessation of said current, and means actuated by said field magnets when said circuit is closed holding said spring from so actuating said movable means.

4. In a time indicating device having a time indicator and a synchronous electric motor that includes a rotor and reducing gears connected with said time indicator for driving the latter, field magnets in an electrical circuit adjacent said rotor for causing rotation of said rotor for driving said reducing gears when said circuit is closed, a housing coaxial with the axis of said rotor enclosing and supporting said reducing gears, means mounting said housing for rotation about said axis, a spring motor, driving means connecting said spring motor with said housing for rotating said housing and the reducing gears therein as a unit about said axis, power means actuated by the current in said circuit and connected with said spring motor for winding the latter to a predetermined degree of tension, and for maintaining said spring against release of said tension, means actuated for movement by said spring motor upon cessation of said current for releasing said spring motor for driving said driving means whereby said spring motor will drive said housing and reduction gears upon such cessation to cause continued driving of said time indicator, means for releasably holding said driving means for driving said housing when said current is on.

5. In a time indicating device having a time indicator and a synchronous electric motor connected therewith for driving the same, which synchronous motor includes a main rotor and field magnets therefor in an electrical circuit, a second rotor supported for rotation within the magnetic field of said magnets for rotation when said magnets are energized by current in said circuit, a spring motor, means providing a positive driving connection between said second rotor and said spring motor for winding the latter upon rotation of said second rotor, means supporting said second rotor for rotation simultaneously with but independently of said main rotor, driving means connecting said spring motor with said time indicator for driving the latter upon cessation of current in said circuit, movable means releasably holding said driving means from actuation by said spring motor when current is flowing in said circuit, said spring motor including its driving connection with said second rotor being arranged and adapted to hold said second rotor against rotation under the influence of said magnetic field for winding said spring motor by a predetermined amount of the power being stored in said spring motor by such rotation of said second rotor, and means connecting said movable means with said spring motor for moving said movable means to a position releasing said driving means upon cessation of current in said circuit and consequent release of the influence of said second rotor on said spring motor.

6. In combination, a time indicator, a synchronous electric motor including a main rotor and field magnets therefor in an electrical circuit, reducing gears connecting said main rotor with said time indicator for driving the latter, a second rotor supported for rotation within the magnetic field of said field magnets for rotation independently of said main rotor when current is flowing in said circuit, a spring motor, means connecting said second rotor with the spring of said spring motor for winding said spring by rotation of said second rotor, driving means connecting said spring motor with said time indicator for driving of said time indicator by said spring motor upon cessation of current in said circuit, movable means releasably holding said driving means stationary against transmission of power from said spring motor to said time indicator, the torque of said second rotor being adapted to hold said spring motor wound to a predetermined tension through the connection between said second motor and said spring, means actuated by said spring motor upon cessation of current in said circuit and consequent cessation of said torque for releasing said movable means from holding said driving means whereby said spring motor will actuate said driving means for driving said time indicator.

ANTON R. NELSON.

REFERENCES CITED

The following references are of record in the file of this patent:

UNITED STATES PATENTS

| Number | Name | Date |
|---|---|---|
| 2,281,493 | Hammond | Apr. 28, 1942 |
| 2,313,466 | Dicke | Mar. 9, 1943 |
| 2,331,267 | Dicke | Oct. 5, 1943 |

FOREIGN PATENTS

| Number | Country | Date |
|---|---|---|
| 573,418 | Germany | Mar. 31, 1933 |